United States Patent [19]

Margetts et al.

[11] Patent Number: 4,815,571

[45] Date of Patent: Mar. 28, 1989

[54] AUTOMATIC ADJUSTER

[75] Inventors: Hugh G. Margetts, Herefordshire; Michael J. England, Gwent; Stephen Hayward, Haywards Heath, all of Great Britain

[73] Assignee: Lucas Industries public limited company, Birmingham, England

[21] Appl. No.: 885,846

[22] Filed: Jul. 16, 1986

[30] Foreign Application Priority Data

Jul. 23, 1985 [GB] United Kingdom ............... 8518595
Mar. 6, 1986 [GB] United Kingdom ............... 8605530

[51] Int. Cl.⁴ .................. F16D 51/00; F16D 65/38
[52] U.S. Cl. .................. 188/79.62; 188/79.63; 188/196 BA; 188/196 D
[58] Field of Search ............... 188/79.5 GE, 79.5 GT, 188/196 D, 196 BA, 71.9

[56] References Cited

U.S. PATENT DOCUMENTS

| 3,360,085 | 12/1967 | Belart | 188/79.56 E |
| 3,746,153 | 7/1973 | Hauth | 188/71.9 X |
| 3,983,975 | 10/1976 | Wright | 188/71.9 X |
| 4,374,551 | 2/1983 | Birkenbach et al. | 188/71.9 |
| 4,416,356 | 11/1983 | Osborne | 188/79.56 E X |

FOREIGN PATENT DOCUMENTS

| 1209452 | 1/1966 | Fed. Rep. of Germany | 188/79.56 E |
| 1418629 | 12/1975 | United Kingdom | 188/79.56 E |
| 2080894 | 2/1982 | United Kingdom | 188/79.56 E |

Primary Examiner—Andres Kashnikow
Assistant Examiner—Richard Potosnak
Attorney, Agent, or Firm—Holman & Stern

[57] ABSTRACT

An automatic brake adjuster has a strut composed of two parts between which there is a non-reversible threaded connection, relative rotation between the parts to vary the strut length being controlled by a clutch ring urged by a spring into clutching engagement with the housing. In order to prevent unwanted de-adjustment, the clutch ring forms a uni-directional locking connection with a housing by means of ratchet teeth on the external periphery of the ring and a pawl mounted in the housing.

6 Claims, 3 Drawing Sheets

AUTOMATIC ADJUSTER

This invention relates to an automatic adjuster, primarily for a vehicle brake, operable to maintain a substantially constant clearance between the braking surfaces respectively of a braking element and a rotatable braking member of the brake, the adjuster being of the kind comprising a strut having two parts between which there is a non-reversible screw threaded connection permitting the effective length of the strut to be increased by relative rotation between the parts under the influence of an adjuster device which incorporates clutch means for controlling said relative rotation in response to the occurrence of excessive clearance between said surfaces.

One form of adjuster of this kind is illustrated in our earlier British Patent Application No. 2116269 applied to a shoe drum brake, and incorporates a clutch member which is urged by resilient means into engagement with a clutch face so as normally to prevent rotation of an adjuster member. Whilst this arrangement operates quite satisfactorily under most conditions there can be a tendency, under heavy vibration for example, for the clutching force to be overcome temporarily, permitting the adjuster member to rotate to a de-adjusted position, giving rise to suddenly increased pedal movement upon brake actuation, and consequent adverse driver reaction.

An object of the present invention is to provide an automatic adjuster in which the aforesaid tendency to random de-adjustment is minimised or avoided.

According to the present invention, an automatic adjuster comprises a strut having two parts between which there is a non-reversible screw threaded connection permitting the effective length of the strut to be increased by relative rotation between the parts under the influence of an adjuster device which incorporates clutch means for controlling said relative rotation in response to the occurrence of excessive clearance between braking surfaces, the clutch means including a rotatable clutch element of which a surface forms a uni-directional locking connection with non-rotatable locking means which resists movement of said element in a de-adjusting direction.

Preferably, said locking connection is formed by ratchet teeth on the clutch element co-operating with a pawl which is rotationally fixed.

In one convenient practical arrangement, the clutch element is of annular form with ratchet teeth formed on a radially facing circumferential surface thereof, the pawl extending radially into engagement with said teeth, the clutch element also having a clutch face for co-operation with a relatively fixed clutch face, said clutch faces being preferably axially directed.

The invention will now be described, by way of example with reference to the accompanying drawings in which.

Figure 1:
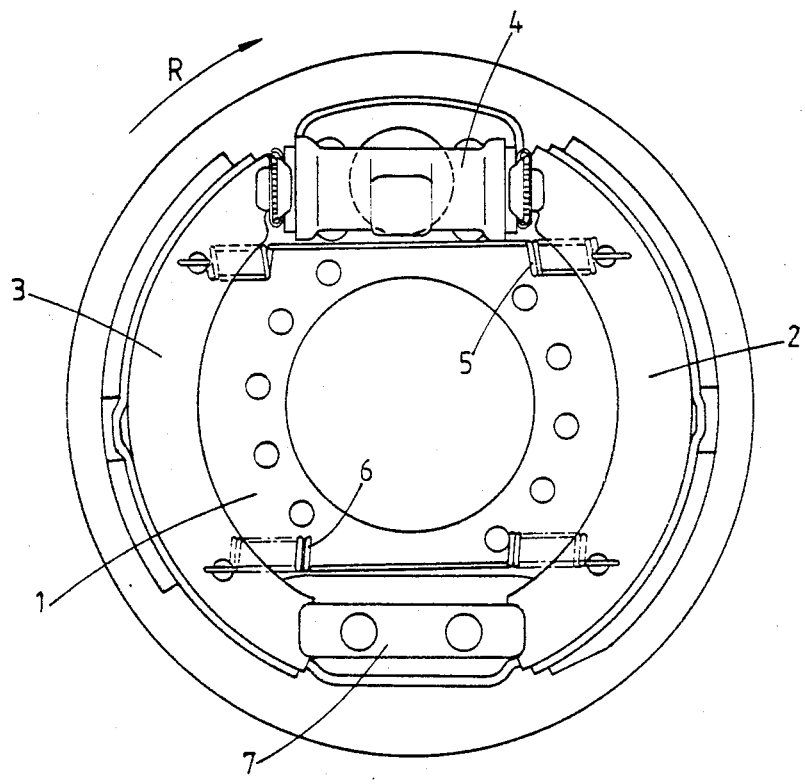
FIG. 1 is an end view of one form of shoe drum brake incorporating the adjuster of the invention.

Referring to FIG. 1, the drum brake shown therein has a torque plate 1 carrying a pair of brake shoes 2, 3. An actuator 4 is rigidly mounted on the torque plate between one pair of adjacent shoe ends and is operable to move the shoes outwardly into braking engagement with a surrounding brake drum (not shown) against the action of a pair of shoe return springs 5, 6. The other pair of adjacent shoe ends engage a torque-reacting abutment member 7 rigidly fixed to the torque plate. The normal forward direction of drum rotation is indicated by the arrow R.

Figure 2:
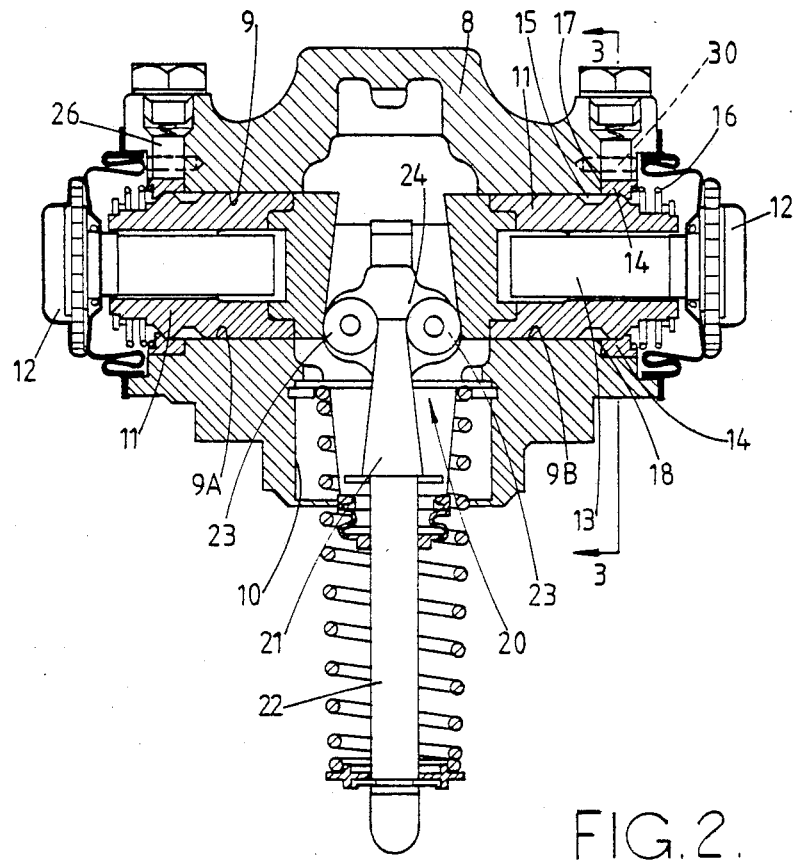
FIG. 2 is a longitudinal cross-sectional view of an actuator of the brake of FIG. 1.

The actuator 4 is shown in greater detail in FIG. 2 and has a body 8 with a through bore 9 and a transverse bore 10 extending at right angles to the bore 9 and dividing the latter into left and right hand bore portions 9A and 9B. Each of these bore portions contains a tappet 11 slidable therein and having a tappet head 12 which engages the adjacent brake shoe. Each head 12 is carried by an adjuster screw 13 threadedly engaged with an internally threaded axial bore of the tappet 11, the screw forming part of an automatic adjuster for the tappet 11 which will be described in more detail hereafter. Since the two tappet assemblies and their associated automatic adjusters are identical, only one will be described in detail.

The adjuster associated with each tappet 11 includes, in addition to the adjuster screw 13, a so-called drive ring 14 (clutch ring) surrounding the tappet, the internal circumference of the drive ring being provided with a reversible thread which is in mesh with a corresponding external thread 15 formed on the tappet 11. A predetermined degree of backlash is provided between the engaged reversible threads, permitting a certain maximum amount of outward movement of the tappet 11 without effect upon the drive ring and it is this backlash which determines the maximum permitted shoe to drum clearance in the brake. The drive ring 14 is urged axially by a spring 16 to bring an axially facing surface 17 thereof into engagement with an opposed surface 18 on the housing 8 so that rotation of the drive ring is normally prevented by frictional clutching action between these engaged surfaces The actuator incorporates mechanical actuating means in the form of a conventional wedge device, indicated generally at 20, and including a wedge 21 fast with and reciprocable by means of an actuating rod 22. The wedge is located between a pair of rollers 23 carried by a cage 24 mounted on the rod 21. The rod 22 would normally be connected to a spring and/or air-operated mechanical actuator of conventional type. Inward thrust applied to the rod 22 by the actuator causes the wedge 21 to separate the rollers 23 which push on the tappets 11, moving the latter outwardly to cause outward expansion of the shoes via the tappet heads 12.

When the outward movement of either tappet 11 is less than that required to take up the backlash in the reversible screw thread connection between the drive ring 14 and tappet 11, the drive ring is not influenced and the adjuster remains inoperative. When said backlash is taken up by excessive outward shoe movement, the force of the spring 16 urging the drive ring into engagement with the clutch face 18 is relieved and frictional torque generated at the reversible screw thread connection by this spring causes the drive ring to rotate, slipping against the clutch face 18, by an amount dependent upon the excess outward movement of the tappet 11. Return movement of the tappet towards the brakes-off position results in the drive ring once more engaging the clutch face 18 and being thereby prevented from rotating, so that reaction between the reversible thread formations respectively on the drive ring and tappet causes the sleeve to rotate. Since the adjuster screw 13 is prevented from rotating by its engagement with the adjacent shoe web via the head 12, the tappet 11 is caused to rotate in a direction such as to move it outwardly of the housing 8 and thereby effectively increase the length of the screw and tappet assembly to set a new outwardly adjusted retracted position for the adjacent shoe. It will be understood that the adjusters associated respectively with the tappets 11 operate in an identical manner.

In some conventional adjusters of this general kind, in which operation of an adjuster member is dependent upon the frictional clutching action of a spring-urged clutch member, it has been found possible under extreme conditions for vibrational forces to overcome the force of the clutch spring urging the clutch member against its clutch seat, resulting in the occurrence of unwanted random de-adjusting movements of the adjuster member. In order to prevent this happening, the drive ring in the adjuster of the invention forms a uni-directional locking connection with non-rotatable locking means. In the embodiment described, and as illustrated in detail in FIG. 3, the drive ring 14 is provided, around its radially outwardly facing periphery, with ratchet teeth 25 which are engaged by a pawl in the form of a radially extending plunger 26 contained within a radial bore 27 of the housing 8. Engagement of the pawl with the drive ring ratchet teeth is effected by a spring 28 acting between the pawl and a separate closure plug 29, the pawl being prevented from rotation by engagement with a transverse pin 30 mounted in the body. The pawl teeth are arranged so that the drive ring 14 is permitted to rotate in the direction necessary for operation of the adjuster, the drive ring being prevented by the pawl from rotation in the opposite direction. It will be seen that any tendency for the drive ring to rotate in a random manner under the effects of vibration will be prevented by the aforesaid uni-directional connection between the drive ring and its pawl.

Figure 3:
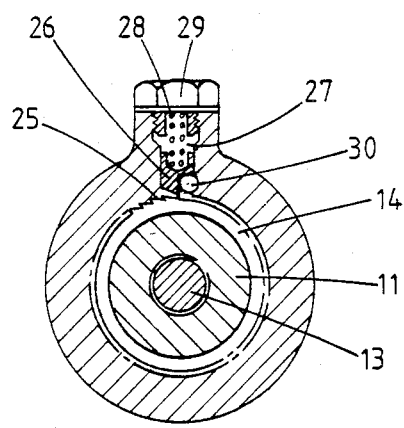
FIG. 3 is a cross-section along the line 3—3 of FIG. 2.
Figure 4:
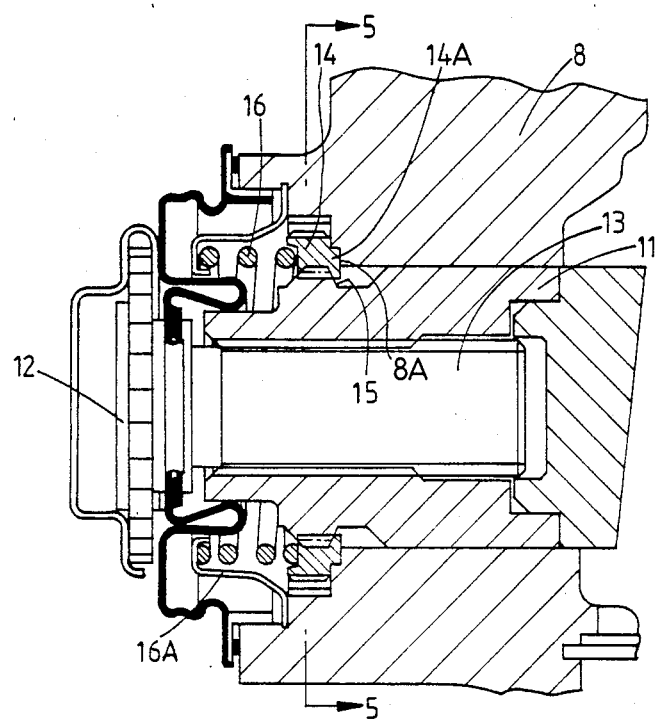
FIG. 4 is a longitudinal cross-section of part of an alternative embodiment of the adjuster of the invention.
Figure 5:
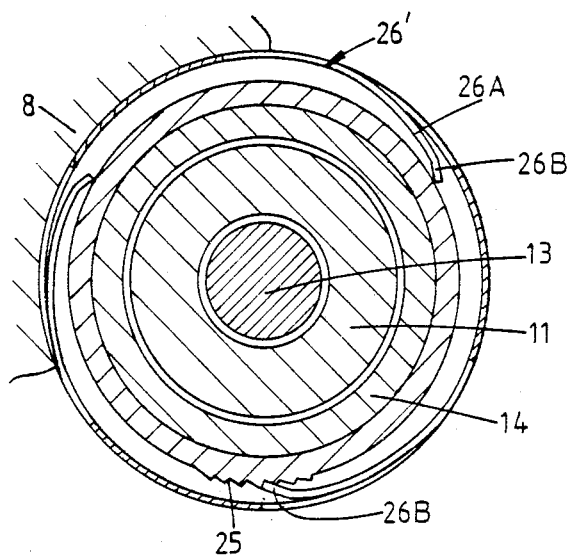
FIG. 5 is a cross-section along the line 5—5 of FIG. 4.

The embodiment illustrated in FIGS. 4 and 5 is generally similar in arrangement and operation to that described above, but incorporates an alternative form of pawl device. The reference numerals of FIGS. 1 to 3 are employed, where appropriate, in FIGS. 4 and 5.

In this alternative embodiment, the pawl device is in the form of a ring 26' which may be press-fitted into the adjuster body 8 as shown, and/or may be provided with formations for engagement with complementary formations on the housing in order to immobilise the ring relative to the housing. The ring has a plurality of tongues 26A which are formed integrally therewith and provided with inwardly bent end portions 26B forming pawls. Three tongues are provided in the arrangement illustrated, but the number may be varied as required. The tongues are bent inwardly to enable the pawls to engage the ratchet teeth 25 formed on the outer circumference of the drive ring 14, the pawls being urged into engagement with the teeth by the inherent resilience of the material of the pawl device. In this embodiment, the clutch spring 16 acting on the drive ring 14 reacts against a pressed cup 16A held fast in a groove of the body. The adjuster operates in the manner described above and the pawl and ratchet teeth permit rotation of the drive ring in one direction for the purpose of adjustment but preclude its rotation in the other direction and thereby prevent unwanted de-adjustment.

In this embodiment the housing bore is stepped to provide a recess 8A which receives an axially projecting portion 14A of the ring 14 in order to locate the ring radially within the housing. The housing clutch face is formed by the axially inner end face 8B of the recess and engaged by the opposed end face of the ring.

A further variant of the adjusters described above has a clutch element, preferably in the form of a ring of which an axially facing surface forms a uni-directional locking connection with an opposed surface of a non-rotatable locking means, the latter typically forming part of or being secured with respect to the body. In a convenient arrangement of this type, said opposed surfaces also constitute a clutch, being normally spring-urged firmly into engagement in order to prevent adjusting operation of the clutch ring, and are also provided with ratchet teeth which form the uni-directional locking connection. In such an arrangement the non-locking flanks of the teeth may together form the clutch surfaces. It can be convenient to form the fixed teeth of the ratchet on an insert subsequently secured to the adjuster body, as by press-fitting, which arrangement facilitates manufacture of the teeth. The clutch spring is preferably retained by a cup similar to that illustrated in FIG. 4.

The adjuster of the invention can differ in various respects from the embodiments described above. Thus, although it is convenient to provide the drive ring with an axially facing clutch face, it would alternatively be possible to provide a conical or even radially facing clutch face, with the ratchet teeth then provided on another surface of the clutch ring. It would also be possible for the uni-directional device itself to be in the form of a frictional clutch, but a positive toothed device is to be preferred for most conditions of use.

We claim:

1. An automatic adjuster for adjusting the position of a braking element of a brake relative to a rotatable braking member of the brake, the adjuster comprising a strut having two parts, a non-reversible screw threaded connection between said two parts of the strut for permitting the effective length of the strut to be increased by relative rotation between the parts under the influence of an adjuster device in order to adjust the position of said braking element, a clutch ring surrounding one of the strut parts, a reversible thread connection between the clutch ring and said one of the strut parts, ratchet teeth on a surface of the ring, a pawl carried by fixed means and co-operating with said ratchet teeth to form a uni-directional locking connection between the ring and said fixed means, said connection resisting rotation of the ring in a direction for decreasing the effective length of the strut and permitting rotation of the ring in an opposite direction for increasing the effective length of the strut by co-operation between the ring and said one of the strut parts at said reversible thread connection, another surface of the ring forming a first clutch face, and the adjuster further including a complementary relatively fixed clutch face for co-operating with said first clutch face and controlling the adjustment of said strut length in response to the occurrence of excessive clearance between said braking element and said braking member.

2. An adjuster according to claim 1 wherein said another surface of the ring and the co-operating relatively fixed clutch face are axially directed.

3. An adjuster according to claim 2 wherein the pawl is formed on a plunger slidable in a bore of a fixed body of the adjuster, the plunger being spring-urged to engage the clutch ring ratchet teeth.

4. An adjuster according to claim 3 wherein the pawl co-operates with means arranged to prevent rotation of the pawl.

5. An adjuster according to claim 4 wherein said anti-rotational means is a pin lodged in the body and extending transversely of the pawl.

6. An adjuster according to claim 1 wherein the clutch element is surrounded by an annular rotationally fixed pawl device which has at least one inwardly directed resilient tongue defining the pawl and co-operating in a uni-directional manner with the ratchet teeth.

* * * * *